(12) United States Patent
Uselmann et al.

(10) Patent No.: US 9,352,772 B2
(45) Date of Patent: May 31, 2016

(54) CONTROLLING A STEERING SYSTEM IN A MOTOR VEHICLE

(71) Applicant: Dr. Ing. h.c. F. Porsche Aktiengesellschaft, Stuttgart (DE)

(72) Inventors: Anton Uselmann, Stuttgart (DE); Gonzalo Francisco Rivera Zago, Fellbach (DE)

(73) Assignee: Dr. Ing h.c. F. Porsche Aktiengesellschaft, Stuttgart (DE)

( * ) Notice: Subject to any disclaimer, the term of this patent is extended or adjusted under 35 U.S.C. 154(b) by 12 days.

(21) Appl. No.: 14/486,288

(22) Filed: Sep. 15, 2014

(65) Prior Publication Data

US 2015/0081173 A1   Mar. 19, 2015

(30) Foreign Application Priority Data

Sep. 16, 2013   (DE) .......................... 10 2013 110 149

(51) Int. Cl.
   *B62D 5/04*   (2006.01)
   *B62D 6/00*   (2006.01)

(52) U.S. Cl.
   CPC .............. *B62D 5/0466* (2013.01); *B62D 6/003* (2013.01); *B62D 6/008* (2013.01)

(58) Field of Classification Search
   None
   See application file for complete search history.

(56) References Cited

U.S. PATENT DOCUMENTS

| | | | | | |
|---|---|---|---|---|---|
| 5,360,080 A | * | 11/1994 | Yamazaki | ................ | F16F 15/02 180/300 |
| 5,386,372 A | * | 1/1995 | Kobayashi | ........... | B60G 17/018 700/280 |
| 5,537,967 A | * | 7/1996 | Tashiro | .................. | B60K 6/485 123/192.1 |
| 6,161,068 A | * | 12/2000 | Kurishige | ............ | B62D 5/0472 180/400 |
| 8,200,392 B2 | * | 6/2012 | Kodaira | ............... | B62D 5/0472 701/41 |
| 8,763,996 B2 | * | 7/2014 | Ishiguro | ............... | B60K 5/1283 267/140.14 |
| 2002/0023517 A1 | * | 2/2002 | Ochiai | ................... | B62D 7/222 74/552 |
| 2007/0205041 A1 | * | 9/2007 | Nishizaki | ................. | B62D 6/10 180/446 |
| 2008/0040001 A1 | * | 2/2008 | Ogawa | ................. | B62D 5/0487 701/41 |
| 2009/0210112 A1 | * | 8/2009 | Waldbauer | ............ | B60T 8/1708 701/42 |
| 2009/0294206 A1 | * | 12/2009 | Oblizajek | ............ | B62D 5/0472 180/446 |
| 2011/0208392 A1 | * | 8/2011 | Kodaira | ............... | B62D 5/0472 701/41 |
| 2015/0100221 A1 | * | 4/2015 | Routledge | ............... | F02D 17/02 701/111 |

FOREIGN PATENT DOCUMENTS

| | | |
|---|---|---|
| DE | 10034222 | 1/2002 |
| DE | 102008007139 | 8/2008 |
| DE | 112007000094 | 4/2009 |

(Continued)

OTHER PUBLICATIONS

Korean Office Action for Korean Application No. 10-2014-120266.
(Continued)

*Primary Examiner* — Fadey Jabr
*Assistant Examiner* — Krishnan Ramesh
(74) *Attorney, Agent, or Firm* — RatnerPrestia

(57) ABSTRACT

A method for controlling a steering system in a motor vehicle, which system is designed to convert a steering wheel angle to a steering angle of a steered wheel of the motor vehicle in order to control a yaw angle of the motor vehicle. The method comprises steps of sampling oscillations of the steering wheel angle and of the yaw rate, detecting a predetermined phase difference between the oscillation of the steering wheel angle and the oscillation of the yaw rate, and increasing damping in the conversion of the steering wheel angle to the steering angle.

8 Claims, 5 Drawing Sheets

(56) References Cited

FOREIGN PATENT DOCUMENTS

| DE | 102009009032 | 8/2010 |
|----|--------------|--------|
| JP | 2000-095132  | 4/2000 |
| JP | 2005-041279  | 2/2005 |
| WO | 2006064343   | 6/2006 |

OTHER PUBLICATIONS

German Search Report dated Feb. 12, 2014, Appl No. 10 2013 110 149.6 (with partial English translation).

* cited by examiner

CONTROLLING A STEERING SYSTEM IN A MOTOR VEHICLE

CROSS-REFERENCE TO RELATED APPLICATIONS

This application claims priority to German Patent Application No. DE 10 2013 110 149.6, filed Sep. 16, 2013, which is incorporated by reference herein it its entirety.

FIELD OF THE INVENTION

The invention relates to a steering system in a motor vehicle. In particular, the invention relates to technology for controlling the steering system.

BACKGROUND

A steering system in a motor vehicle converts a steering wheel angle of a steering wheel into a steering angle of a steered wheel in order to control a yaw angle of the motor vehicle. The yaw angle refers to a rotation of the motor vehicle about the vertical axis thereof. The practice of intervening in the steering system during certain maneuvers in order to maintain directional stability of the motor vehicle is known. If the steering wheel is turned quickly and then released when traveling at high speed, for example, the change of direction of the motor vehicle may escalate, with the risk that the vehicle will break away or tip over. This effect can be reinforced by a suspension system of the motor vehicle with springs between the body and wheels.

To avoid such uncontrollable driving states, the steering system is usually damped at a constant rate with a predetermined factor. The damping can prevent overshooting of the steering angle or of the yaw angle and thus stabilize the motor vehicle. However, the disadvantage of this is that the damping is active throughout driving operation and can have a negative effect on the feel of the steering. This can be perceived as troublesome by a driver of the motor vehicle, especially at relatively low speeds.

DE 10 2009 009 032 A1, which is incorporated by reference herein, shows a method for detecting yawing oscillations of a motor vehicle when a driver has released the steering wheel. In this case, characteristics of the steering angle, of the steering torque and of the angular steering acceleration are detected and analyzed so as to be able to predict the occurrence of yawing oscillations. It is proposed to actively compensate a detected yawing oscillation.

WO 2006/064343, which is incorporated by reference herein, shows technology for influencing a steering system of a motor vehicle, wherein a steering wheel force required to change the steering angle is reduced if it has been detected that the driver is no longer gripping the steering wheel. An auxiliary drive is provided to reduce the required force.

SUMMARY

It is the underlying object of the invention to indicate improved technology for controlling a steering system in a motor vehicle, which allows a driver direct control of the motor vehicle and, at the same time, assists in avoiding an unstable driving state of the motor vehicle. The invention achieves this object by means of a method, of a computer program product and of a device having the features of the independent claims. Dependent claims indicate preferred embodiments.

A steering system in a motor vehicle is designed to convert a steering wheel angle to a steering angle of a steered wheel of the motor vehicle in order to control a yaw angle of the motor vehicle or a yaw rate, which is the time derivative of the yaw angle. A method according to aspects of the invention for controlling the steering system comprises steps of sampling oscillations of the steering wheel angle and of the yaw rate, detecting a predetermined phase difference between the oscillation of the steering wheel angle and the oscillation of the yaw rate, and increasing damping in the conversion of the steering wheel angle to the steering angle.

It is thereby possible to damp the steering system more strongly when the phase difference is present than when it is not present. The phase difference can appear, in particular, when the steering wheel is actuated quickly and then released. In the case of a conventional control method, a "hands-off oscillation" of the motor vehicle about the vertical axis thereof can then occur. Owing to the intensified damping on detection of the phase difference, the motor vehicle can be selectively stabilized if it can be assumed that the driver is not currently gripping the steering wheel.

The steering system preferably comprises a servo steering system for converting a steering wheel force to an amplified steering force at the steered wheel. Particularly in the case of a servo steering system, it may be essential to exert appropriate damping on the steering system in order to achieve both good haptic feedback to the driver during steering movements and to avoid oscillation behavior, e.g. hunting.

In one embodiment, the damping is modified only above the predetermined threshold value. In another embodiment, there is a continuous relationship between the phase difference and the increase in the damping. In particular, there can be a linear or exponential relationship in order to make the adaptation of the damping particularly well integrated and possibly without any noticeable transition.

In a particularly preferred embodiment, the increased damping is brought about by increasing a counterforce opposed to the steering wheel force. This can be easily controllable, particularly in combination with a servo steering system.

In one embodiment, the phase difference is determined on the basis of frequencies and time shifts of the oscillations. It is thereby possible to determine the phase difference quickly while, at the same time, avoiding erroneous determination of shifted oscillations when in fact all that is happening is that the vehicle is cornering, for example.

The phase difference is preferably determined on the basis of half a period of the oscillations of the steering wheel angle and of the yaw rate respectively. The half period can be sufficient to determine the phase difference. At the same time, a half period is usually sufficient to determine the presence of an oscillation.

In another embodiment, the damping can be determined on the basis of a rate of change of the steering angle. With an increasing rate of change of the steering angle, the damping can increase in order to allow rapid maneuvering and, at the same time, to suppress uncontrolled yawing movements of the motor vehicle.

The damping can furthermore be determined on the basis of a speed of travel of the motor vehicle. The faster the motor vehicle is traveling, the greater can be the damping. This allows particularly precise driving in the low speed range while, at the same time, allowing uncritical steering behavior in the high speed range.

A computer program product according to aspects of the invention comprises program code means for carrying out the method described when the computer program product runs on a processing device or is stored on a computer-readable data medium.

A control device according to aspects of the invention for controlling the above-described steering system in a motor vehicle comprises a first sampling device for sampling an oscillation of the steering wheel angle, a second sampling device for sampling an oscillation of the yaw rate, a processing device for determining a phase difference between the oscillation of the steering wheel angle and the oscillation of the yaw rate, and a damping device for increasing the damping in the conversion of the steering wheel angle to the steering angle if the phase difference determined exceeds a predetermined threshold value.

BRIEF DESCRIPTION OF THE DRAWINGS

The invention is now described in greater detail with reference to the attached figures, in which.

DETAILED DESCRIPTION

Figure 1:
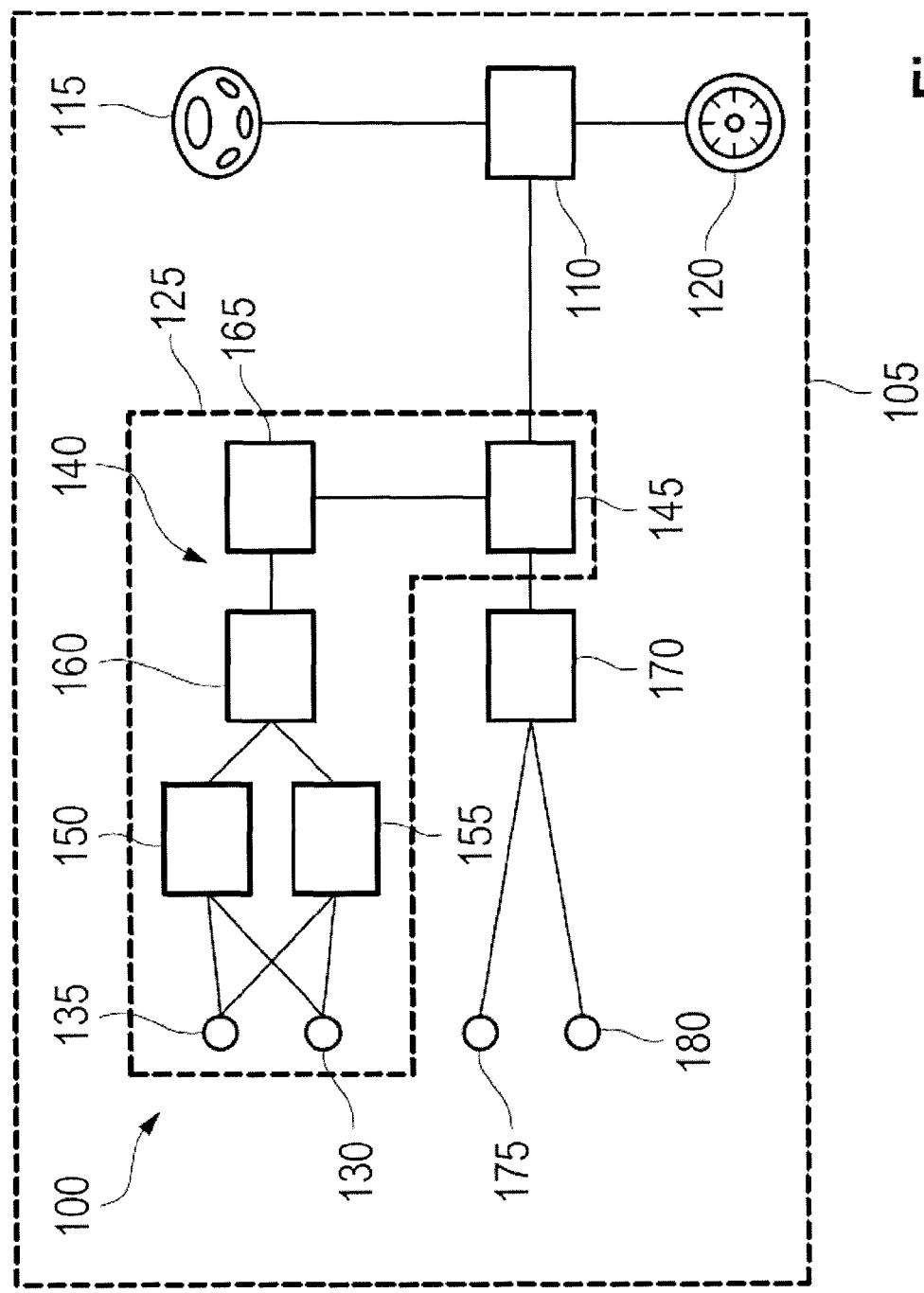
FIG. 1 shows a controllable steering device on a motor vehicle.

FIG. 1 shows a steering device 100 on board a motor vehicle 105. A conversion device 110 is designed to convert a steering wheel angle of a steering wheel 115 to a steering angle of a steered wheel 120 of the motor vehicle 105. If the motor vehicle 105 moves while the steering angle of the wheel 120 is constantly negative or positive, the motor vehicle 105 describes a clockwise or counterclockwise curve, with a yaw angle of the motor vehicle 105 falling or rising in a corresponding manner and the yaw rate being negative or positive. The conversion device 110 is preferably active and comprises a driving device for amplifying a steering wheel force of the steering wheel 115 into a steering force at the steered wheel 120. In particular, the drive can be electric or hydraulic.

Damping of the steering movement can preferably be performed by means of the conversion device 110. This preferably involves appropriate control of a counterforce opposed to a steering force on the steering wheel 115. If the counterforce is high, the damping is high.

To control the damping, a device 125 is provided. The device 125 comprises a first sampling device 130 for sampling a steering wheel angle of the steering wheel 115, a second sampling device 135 for sampling a yaw rate of the motor vehicle 105, a processing device 140 for determining a phase difference between the oscillation of the steering wheel angle and the oscillation of the yaw rate, and a damping device 145 for increasing the damping of the conversion device 110 when the phase difference determined is above a predetermined threshold value. The processing device 140 can comprise a first function block 150 for determining a shift in the oscillations of the steering wheel angle and in the yaw rate, and a second function block 155 for determining frequencies of the oscillations of the steering wheel angle and of the yaw rate. A third function block 160 can determine the phase difference on the basis of the frequency determined and of the shift determined. The phase difference determined can be converted in a fourth function block 165 into damping. In one embodiment, the damping can be increased when the phase difference determined has exceeded a predetermined threshold value. In another embodiment, there can be a continuous relationship between the rising phase difference and the rising damping. In particular, the relationship can be linear or exponential.

As an option, the damping device 145 is adjusted around a basic damping 170. The basic damping 170 can be constant or can be determined on the basis of parameters on the motor vehicle 105. For example, the basic damping 170 can be determined on the basis of sampled values of a third sampling device, which samples a rate of change of the steering angle at the wheel 120, or of a fourth sampling device 180, which samples a speed of travel of the motor vehicle 105.

Figure 2:
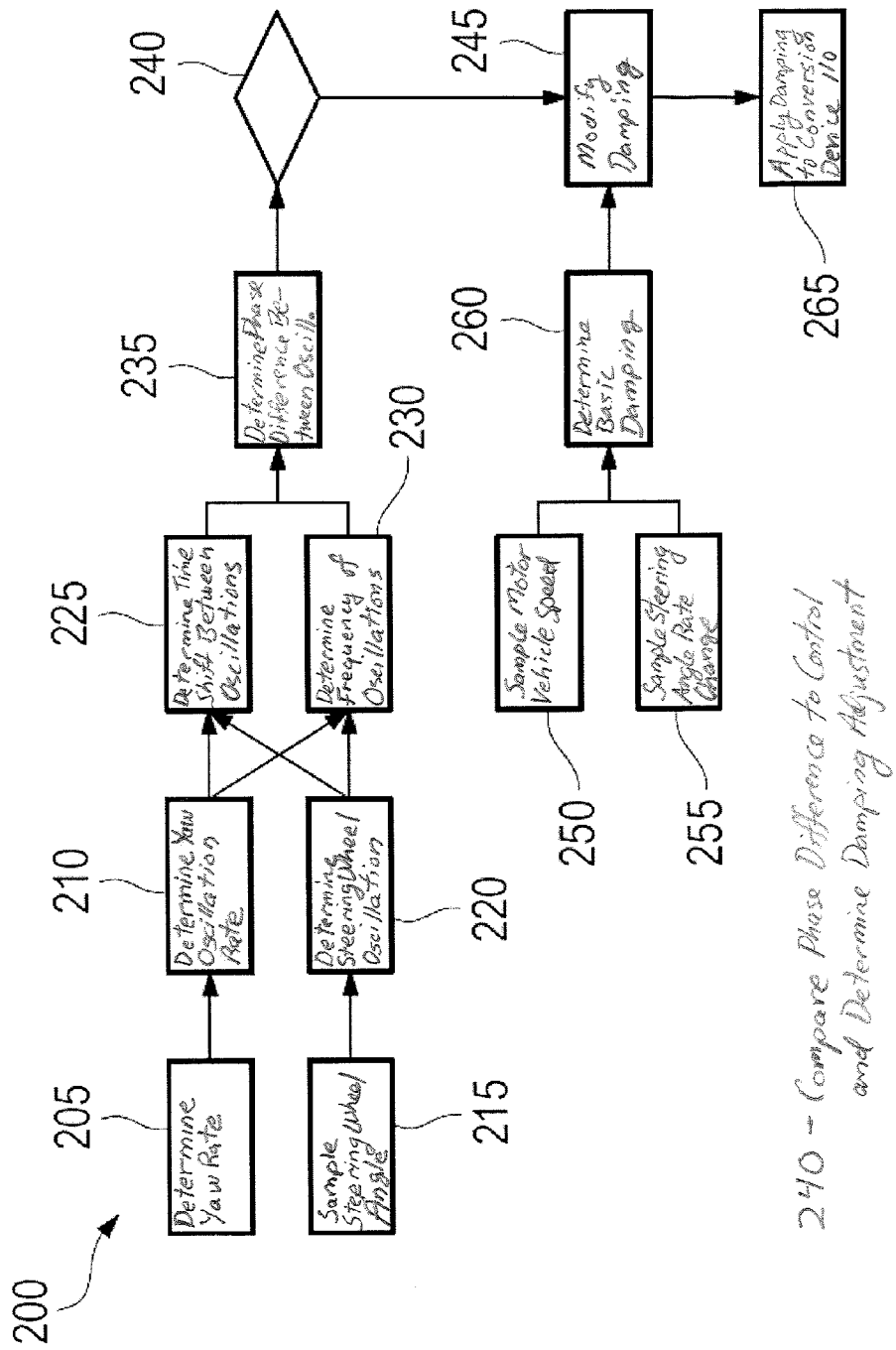
FIG. 2 shows a method for controlling the steering device in FIG. 1.

FIG. 2 shows a sequence diagram of a method 200 for controlling the steering device 100 in FIG. 1. In particular, the method 200 is designed for running on the processing device 140. For this purpose, the processing device 140 can be constructed as a discrete unit or can preferably be designed as a programmable microcomputer.

In a first step 205, a yaw rate of the motor vehicle 105 is determined. The yaw rate refers to a speed of rotation of the motor vehicle 105 about the vertical axis. In one embodiment, this purpose can be served by determining the yaw angle and forming the time derivative thereof. In a step 210, an oscillation of the yaw rate is determined. If there is no oscillation or if the amplitude of the oscillation is too low, the method 200 can be ended at this point.

In a step 215, the steering angle of the steering wheel 115 is sampled. In a step 220, an oscillation of the steering angle is then determined. If there is no oscillation or the amplitude of the oscillation is too low, the method 200 can end at this point.

On the basis of the oscillations determined in steps 210 and 220, a time shift between the oscillations is then determined in a step 225, and a frequency of the oscillations is determined in a step 230. If the frequencies of the oscillations do not coincide, the method 200 can be aborted at this point. In a step 235, a phase difference of the oscillation of the yaw rate with respect to that of the steering angle is then determined on the basis of the time shift determined and of the frequency determined.

In a step 240, a check is made to determine whether the phase difference determined exceeds a predetermined threshold value. In this case, damping of the steering device 100 in FIG. 1 should be raised. As an alternative, it is also possible for damping to be determined in step 240 on the basis of the phase difference determined, wherein a continuous relationship, e.g. of a linear or exponential nature, is preferably assumed. The damping determined is made available in a step 245.

The damping made available in step 245 can also take account of other parameters. For example, the speed of travel of the motor vehicle can be sampled in a step 250, or the rate of change of the steering angle can be sampled in a step 255. This information can be used in a step 260 to determine basic damping, which is modified in step 245 on the basis of the phase difference determined in step 235 between the oscillation of the yaw rate and the oscillation of the steering angle. However, this basic damping and the determination thereof are optional.

Finally, the damping made available in step 245 is applied in a step 265, e.g. by activation of the conversion device 110 between the steering wheel 115 and the steerable wheel 120 to carry out the predetermined damping of the conversion of the steering wheel angle to the steering angle.

Figure 3:
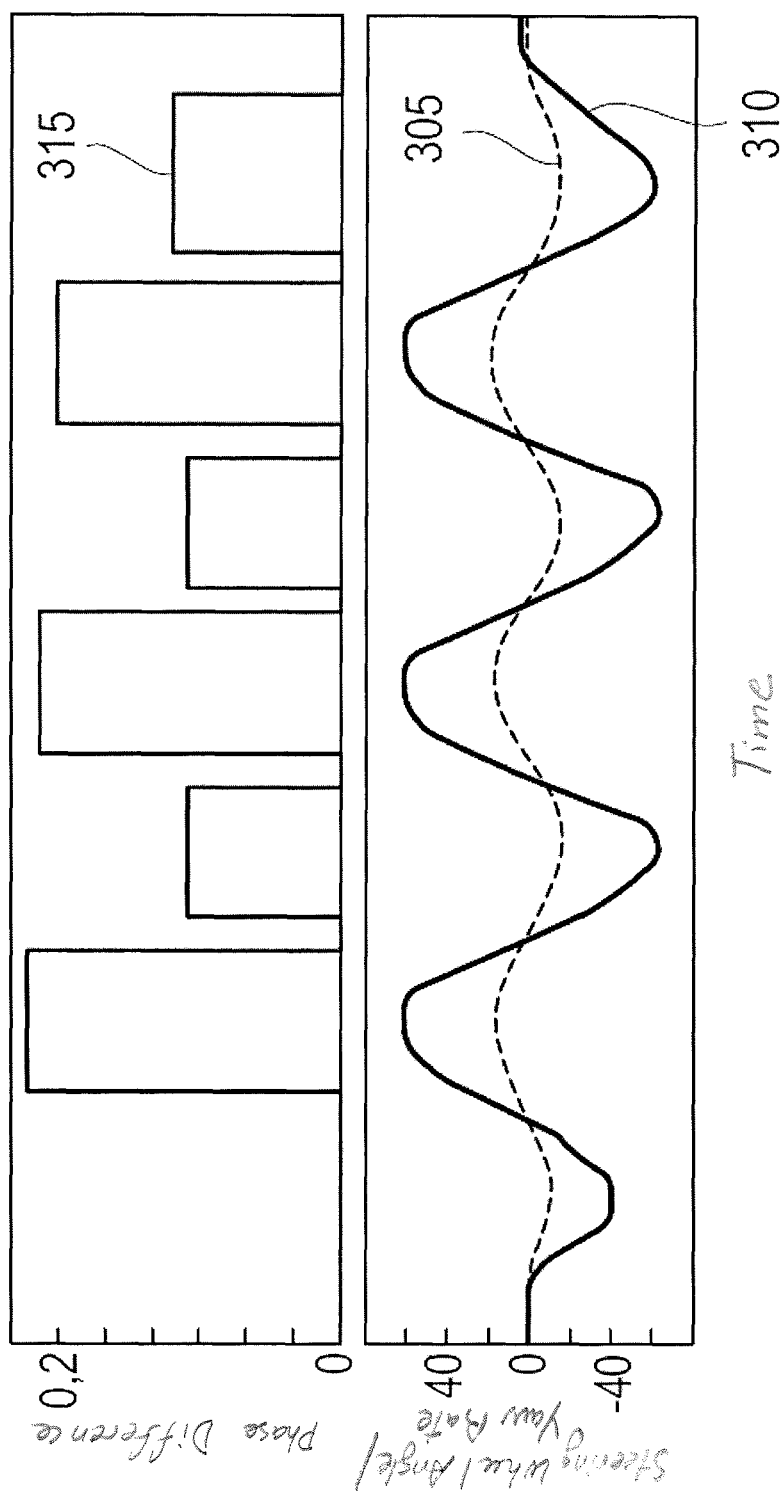
FIGS. 3 to 5 show characteristics on the steering device in FIG. 1.

FIG. 3 shows characteristics at the steering device 100 in FIG. 1 during a slalom course at 50 km/h. A steering wheel angle 305 and a yaw rate 310 are shown in the bottom area.

Phase differences 315 between the oscillation of the steering wheel angle 305 and the oscillation of the yaw rate 310 after mathematical determination are shown in the top area. A time is plotted in the horizontal direction and applies to both the top and bottom areas. It will be apparent that the phase difference 315 can only be determined once the steering wheel angle 305 and the yaw rate 310 have oscillated for at least half a period. The frequency of the two characteristics 305 and 310 is then clear, allowing the phase difference to be determined.

Figure 4:
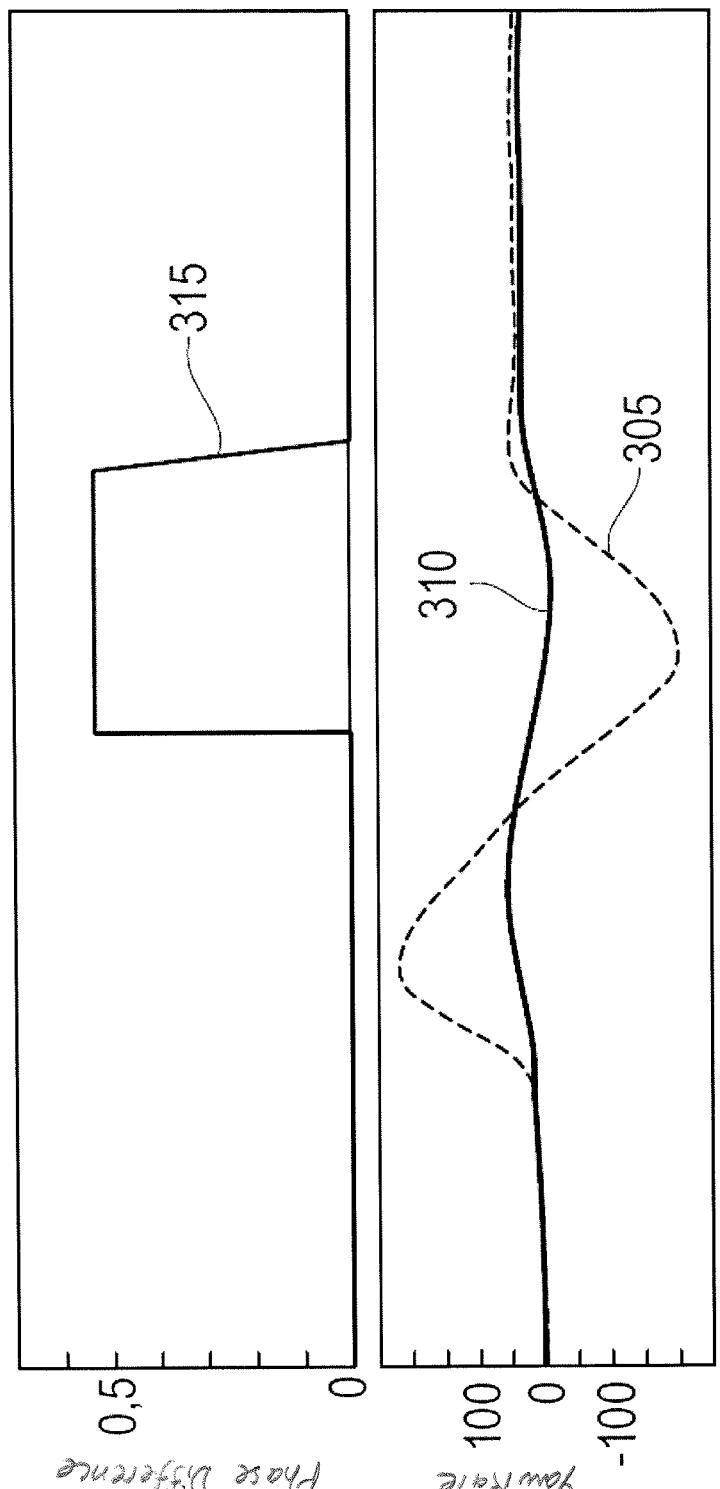

FIG. 4 shows an illustration corresponding to that in FIG. 3, wherein a lane change at about 80 km/h has been used as the underlying maneuver.

Figure 5:
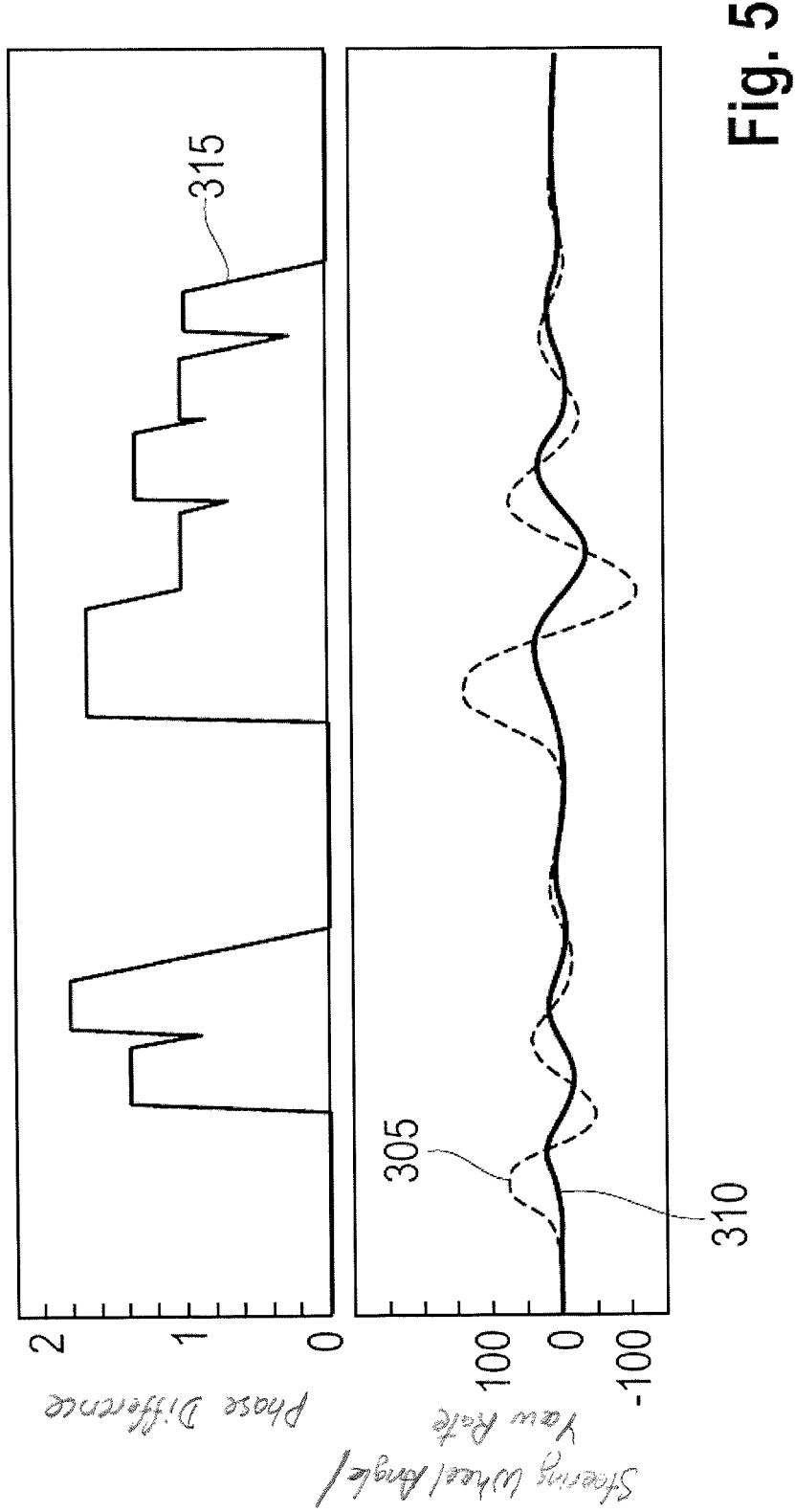

FIG. 5 shows another corresponding illustration, wherein the steering wheel 115 has been turned ("jerked") and then released at a speed of about 80 km/h. This maneuver is known as a "hands-off maneuver". It can be seen that the phase difference 315 during this maneuver is very much higher than in the case of the maneuvers in FIGS. 3 and 4. The increased damping of the steering can be implemented when a defined threshold value for the phase difference 315 is exceeded. This threshold value can be about 0.8 to 1.1, for example.

What is claimed is:

1. A method for controlling a steering system in a motor vehicle, wherein the steering system converts a steering wheel angle to a steering angle of a steered wheel of the motor vehicle in order to control a yaw rate of the motor vehicle, and the method comprises the following steps:
   sampling of oscillations of the steering wheel angle and of the yaw rate;
   detecting a predetermined phase difference between the oscillation of the steering wheel angle and the oscillation of the yaw rate; and
   increasing damping in the conversion of the steering wheel angle to the steering angle, wherein the steering system comprises a servo steering system for converting a steering wheel force to an amplified steering force at the steered wheel, and wherein the increased damping is brought about by increasing a counterforce opposed to the steering wheel force.

2. The method as claimed in claim 1, wherein there is a continuous relationship between the phase difference and the increase in the damping.

3. The method as claimed in claim 1, wherein the phase difference is determined on the basis of frequencies and time shifts of the oscillations.

4. The method as claimed in claim 1, wherein the phase difference is determined on the basis of half a period of the oscillations of the steering wheel angle and of the yaw rate respectively.

5. The method as claimed in claim 1, wherein the damping is determined on the basis of a rate of change of the steering angle.

6. The method as claimed in claim 1, wherein the damping is determined on the basis of a speed of travel of the motor vehicle.

7. A computer program product having program code means for carrying out the method as claimed in claim 1, when the computer program product runs on a processing device or is stored on a non-transitory computer-readable data medium.

8. A control device for controlling a steering system in a motor vehicle, wherein the steering system converts a steering wheel angle to a steering angle of a steered wheel of the motor vehicle in order to control a yaw angle of the motor vehicle, and the control device comprises the following elements:
   a first sampling device for sampling an oscillation of the steering wheel angle;
   a second sampling device for sampling an oscillation of the yaw rate;
   a processing device for determining a phase difference between the oscillation of the steering wheel angle and the oscillation of the yaw rate and for determining whether the phase difference determined exceeds a predetermined threshold value; and
   a damping device for increasing the damping in the conversion of the steering wheel angle to the steering angle upon a determination that the phase difference determined exceeds a predetermined threshold value, wherein the steering system comprises a servo steering system for converting a steering wheel force to an amplified steering force at the steered wheel, and wherein the increased damping is brought about by increasing a counterforce opposed to the steering wheel force.

\* \* \* \* \*